US008706538B1

(12) United States Patent
Morinville (10) Patent No.: US 8,706,538 B1
(45) Date of Patent: Apr. 22, 2014

(54) BUSINESS PROCESS NESTING METHOD AND APPARATUS

(76) Inventor: Paul V. Morinville, Georgetown, TX (US)

( * ) Notice: Subject to any disclaimer, the term of this patent is extended or adjusted under 35 U.S.C. 154(b) by 1852 days.

(21) Appl. No.: 10/417,929

(22) Filed: Apr. 17, 2003

Related U.S. Application Data (60) Provisional application No. 60/373,292, filed on Apr. 17, 2002.

(51) Int. Cl.
*G06Q 10/00* (2012.01)

(52) U.S. Cl.
USPC ....... 705/7.13; 705/7.15; 705/7.16; 705/7.17; 705/7.21

(58) Field of Classification Search
USPC ............... 705/1, 7, 8, 9, 10, 7.13, 7.15, 7.16, 705/7.17, 7.21
See application file for complete search history.

(56) References Cited

U.S. PATENT DOCUMENTS

| | | | | |
|---|---|---|---|---|
| 5,315,504 | A * | 5/1994 | Lemble | 700/90 |
| 5,754,857 | A * | 5/1998 | Gadol | 709/203 |
| 5,842,182 | A * | 11/1998 | Bonner et al. | 705/32 |
| 5,926,100 | A * | 7/1999 | Escolar | 340/691.3 |
| 5,960,404 | A * | 9/1999 | Chaar et al. | 705/8 |
| 6,745,382 | B1 * | 6/2004 | Zothner | 717/107 |
| 7,050,555 | B2 * | 5/2006 | Zargham et al. | 379/115.01 |
| 2002/0065885 | A1 * | 5/2002 | Buonanno et al. | 709/205 |
| 2002/0188535 | A1 * | 12/2002 | Chao et al. | 705/35 |
| 2002/0194181 | A1 * | 12/2002 | Wachtel | 707/10 |
| 2003/0033167 | A1 * | 2/2003 | Arroyo et al. | 705/1 |
| 2003/0033191 | A1 * | 2/2003 | Davies et al. | 705/10 |
| 2003/0036934 | A1 * | 2/2003 | Ouchi | 705/7 |
| 2003/0093340 | A1 * | 5/2003 | Krystek et al. | 705/28 |
| 2003/0149578 | A1 * | 8/2003 | Wong | 705/1 |
| 2003/0149599 | A1 * | 8/2003 | Goodall et al. | 705/2 |
| 2003/0191679 | A1 * | 10/2003 | Casati et al. | 705/8 |
| 2004/0064329 | A1 * | 4/2004 | Broad et al. | 705/1 |
| 2005/0049903 | A1 * | 3/2005 | Raja | 705/7 |
| 2007/0179790 | A1 * | 8/2007 | Leitch et al. | 705/1 |

FOREIGN PATENT DOCUMENTS

| | | | |
|---|---|---|---|
| WO | WO 2005033933 | * | 4/2005 |

OTHER PUBLICATIONS

Casati, F. "Specification and Implementation ..Systems", 2000 ACM Transactions on Database Systems, vol. 24, No. 3, Sep. 1999, pp. 405-451.*
"Workflow Management Coalition . . . MIME Binding", Document No. WFMC-TC-1018, Jul. 6, 1998, pp. 1-92.*
Hagen, C., "Exception Handling in Workflow Management Systems", IEEE Transactions on Software Engineering., vol. 26, No. 10, Oct. 2000, pp. 943-958.*
Google Scholar Search, Jul. 31, 2013.*
Sadig, S.W.,"On Capturing Exceptions in Workflow Process Models", 2000, SpringerVerlag London Limited, BIS 2000, pp. 1, 4.*

* cited by examiner

*Primary Examiner* — Dean T Nguyen
(74) *Attorney, Agent, or Firm* — Law Offices of Mark L. Berrier

(57) ABSTRACT

Systems and methods for providing interaction of multiple business process events by nesting the information from prerequisite events into a business process that is dependent on those processes to transact. In one embodiment, a business process comprises a dependent event that is launched by users, completed events or application calls and one or more prerequisite events that are launched by dependent events. The dependent event, rather than the prerequisite event, manages a set of rules used to evaluate nested information, determine if an exception is required and who needs to approve exceptions. Nested information is used by a dependent event to automatically monitor the progress of each prerequisite event. Nesting allows prerequisite events to be free of business rules, so they can be reused by many dependent processes without duplication. A library of prerequisite events can be kept so new business processes can be quickly constructed using already existing events.

24 Claims, 13 Drawing Sheets

BUSINESS PROCESS NESTING METHOD AND APPARATUS

CROSS-REFERENCE TO RELATED APPLICATIONS

This application claims priority to U.S. Provisional Patent Application No. 60/373,292, entitled "Business Process Nesting Method And Apparatus," by Paul V. Morinville, filed Apr. 17, 2002, which is incorporated by reference as if set forth in its entirety herein.

FIELD OF THE INVENTION

The invention relates generally to systems and methods for automating business processes. More specifically is relates to systems and methods for providing interaction of multiple business process events by nesting the information from prerequisite events into a business process that is dependent on those processes to transact.

BACKGROUND

Market conditions have driven companies to leverage employees, partners, suppliers, customers and information to reduce costs. To successfully accomplish this, organizations must efficiently control the way people, resources, and information technology interact. This can be referred to as Business Process Management (BPM).

Business processes are used to control costs, speed production, increase resource efficiency and control information that is shared among internal and external participants, and across applications. Thousands of business processes permeate such areas as engineering, manufacturing, distribution, sales, branding, marketing, advertising, purchasing, corporate communications, legal, customer relations, finance, staffing, payroll, benefits, training, employee records and more.

A business process is an ordered series of events. An event is the managed change of information from one or more sources to one or more destinations. Sources and destinations can be internal, customer, or partner applications, documents, vendor catalogs, etc. Controlling the change is generally accomplished by managing how the event is accessed, who collaborates to perform the change and how it is approved. Typically, an event manages on a single item or a group of similar items. For example, the purchase of a pen is an event. Access is often restricted to certain users. When launched, the price and description of the pen is pulled from the vendor catalog, and the billing cost center and user information is pulled from internal company applications. The user makes changes and a manager may be required to approve the purchase. Once approved, a purchase order is sent to the vendor and to accounts payable.

A business process can be a comprised of a single event as in the purchase of a pen, or it can be a complex succession hundreds of events launched both sequentially and simultaneously at varying points in business process. Some events simply perform their function and stop, while other events perform their function and launch another set of events. Events that must be completed in order to launch another event are referred to as prerequisite events and events that are dependent on the completion of prerequisite events are called dependent events.

Figure 1:
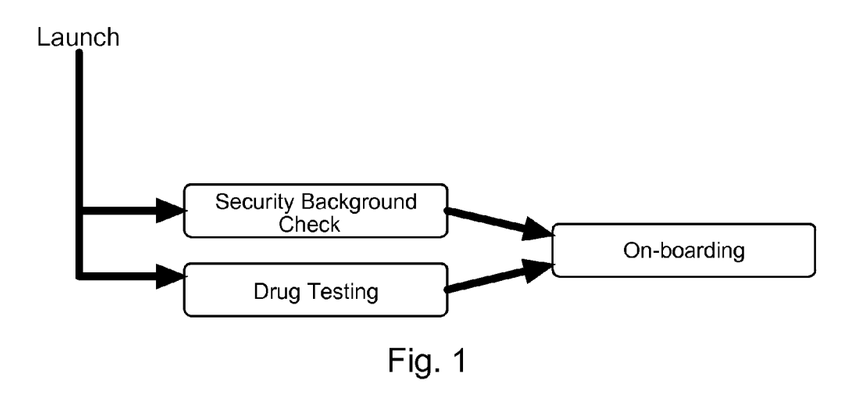
FIG. 1 is a diagram illustrating the launch of events in current systems.

Reuse of Events:

Referring to FIG. 1, current systems launch events in a series such that one or more prerequisite events are launched and upon completion, one or more dependent events are launched. For example, the business process to create a new employee record (commonly called on-boarding) is dependent on positive completion of security background check and drug testing events. Current systems require that the security background check and the drug testing event be launched together and when they are both completed the On-Boarding event is launched.

The same event is often required in more than one business processes. For example, an event of purchasing a pen may be required when hiring a new employee and therefore is one of the events in an on-boarding business process. Current employees may also need to purchase pens during the normal course of day-to-day business, so it is also used as its own business process.

Depending on the use of the event, different access and approval rules may be applied. For example, the event of purchasing a pen when used in an on-boarding business process would likely be launched by the completion of the security background test and drug testing events and therefore would not need to have access controlled. It would also not need to have any approval because it is part of an approved business process. However, when used as a business process by employees who are already on-board, access to purchase a pen could be restricted to area administrators and a first level manager may be required to approve the purchase. In current systems, these access and approval rules are a defined in the event. If the same event were used in both processes and the event rules required access control and approval, the day-to-day purchase of a pen would work fine, but the on-boarding process would require a unnecessary approval and may require that the administrative assistant launch it manually. If the same event were used in both processes and the event rules required no access control and no approval, the on-boarding process would work fine, but any employee could order pens and nobody would be required to approve it.

Problem:

Each use of an event requires the creation of a new event; events cannot be reused. This increases the time and cost of creating new business processes. Because there are multiple instances of the same event, changes that affect similar events need to be made to each event one at a time. For example, if the company changes the pen supplier from one vendor to another, the vendor must be changed in each event that purchases a pen. Some events could be duplicated dozens of times to satisfy all the possible processes, requiring dozens of changes. If it were possible to reuse the same event for all processes, then it would only require one change.

Exception Management:

In the day-to-day course of doing business, it is often necessary to override one or more prerequisite events to allow the dependent event to launch. This is exception management. Because current systems launch events sequentially, each prerequisite event must be monitored to ensure the business process can continue. For example, the recruiter must monitor the security background check and the drug test events to ensure they are completed in time to launch the on-boarding event so the new employee can start work the planned start date.

If it is determined that a prerequisite event will not be completed before the dependent event needs to launch, an exception is necessary to continue the business process. Exceptions generally require approval, so the user who monitors the business process must identify the need and notify the approver of the problem. Upon approval, the user or an administrator overrides the event. For example, a newly hired candidate needs to start quickly to fill a critical business need. The recruiter monitors the hiring process and determines that the security background check will be not completed before the start date. He gathers information and notifies the VP that he needs an override. The VP reviews and approves. The recruiter contacts the administrator who manually overrides the security background check. The system then launches the on-boarding process to create an employee record and start the candidate.

Problem:

Managing an exception can take as little as a few hours, but will often take several days during which time the business process can stall. A stalled process can translate to stalled revenue, lost business, dissatisfied customers, missing assets, or many more problems. For example, starting a new employee critical to a project that directly impacts revenue can be delayed by a week or more. A technical support process can impact customer uptime putting the customer at risk. A delayed sales process can lose the deal. A delayed engineering change order can take a factory down. In addition, time is consumed monitoring the events and managing exceptions. Labor consumed in a large company with thousands of business processes can translate to millions of dollars per year in unnecessary costs.

Monitoring:

Each event in a business process requires constant monitoring and regular exception management. For example, a recruiter in a large manufacturing or sales organization may hire 100 employees per week. The on-boarding process of each candidate must be monitored daily to ensure that new employees start timely. An on-boarding process may have 15 to 20 events, so the recruiter may need to monitor between 1500 and 2000 events per day.

Problem:

The volume and complexity of business processes is very high and frequently exceptions are missed causing the process to stall. In companies that have automated many business processes, a significant amount of time is used monitoring ongoing processes.

Conclusion:

A business process management platform that automatically monitors events and process exceptions, and is capable of reusable events is therefore necessary to decrease cost, improve efficiency and reduce complexity so management can improve control.

SUMMARY OF INVENTION

One or more of the problems outlined above may be solved by the various embodiments of the invention. Broadly speaking, the invention comprises systems and methods for automating and increasing the efficiency of business processes using a reusable event that can be linked as prerequisite or dependent events to create complex business processes.

Figure 2:
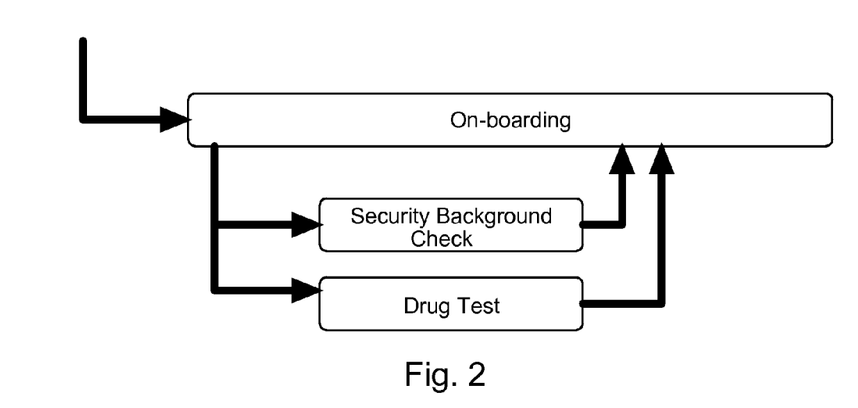
FIG. 2 is a diagram illustrating the launch of events in accordance with one embodiment of the invention.

In one embodiment of the invention, there are prerequisite and dependent events. Referring to FIG. 2, a dependent event is the primary event that is launched by users, completed events or application calls. Prerequisite events are secondary events that are launched by dependent events.

In the preferred embodiment of this invention, certain information processed by prerequisite event(s) may be monitored and used by the dependent event. This is called Nesting.

Nested information may be analyzed by the dependent event against rules contained in the dependent event to determine if approvers are necessary and if so, who those approvers are. This allows prerequisite events to be free of rules so they can be reused in any number of dependent events and allows exceptions to be managed for all prerequisite events launched by the dependent event.

For example, the on boarding event is a dependent event. The security background and the drug testing events are the prerequisite events. When the on-boarding event is launched by a user, it launches the security background and drug test events. The status of each prerequisite event is "nested" into the on-boarding event. The on-boarding event monitors the status to determine if it can proceed to create a new employee record. When both prerequisite events have a status of completed, the on boarding event can create a new employee record without approval. If the user attempts to complete the on-boarding event with one or both status not completed, the on-boarding event will analyze the status against business rules contained in the on-boarding event and require approval to create a new employee record Exception Management:

The dependent event stores and manages a set of rules used to evaluate nested information, determine if an exception is required and if so, who needs to approve it. These rules are stored, managed and administered within the dependent event and not within the prerequisite event.

Value:

Nesting prerequisite information into the dependent event consolidates the administration and management of unlimited events into a single event. The entire business process made up of hundreds of events may be managed using a single dependent event or a series of dependent events. All exceptions are automatically managed making it difficult to overlook an exception and stall the process. Overall, users are more efficient, it is unlikely that business processes will stall unnecessarily, and management control of complex business processes is greatly improved.

Monitoring:

Nested information is used by a dependent event to automatically monitor the progress of each prerequisite event.

Value:

Nesting information allows the user to monitor only one event even though hundreds may be actually occurring reducing the time it takes to monitor each event and improving the quality of the business process.

Reuse:

Nesting allows prerequisite events to be free of business rules, so they can be reused by many dependent processes without duplication. A library of prerequisite events can be kept so new business processes can be quickly constructed using already existing events.

Value:

Source or destination addresses can be changed in a single place, and immediately impact every business process. New business processes can be built and deployed in a fraction of the time. Current business processes can be quickly changed by adding or removing prerequisite events.

Various alternative embodiments of the invention are possible, and will be evident to persons of skill in the art of the invention upon reading this disclosure. The descriptions here and are therefore intended to be illustrative, rather than limiting of the invention which is claimed below.

DETAILED DESCRIPTION OF PREFERRED EMBODIMENTS

In the preferred embodiment of this invention, a business process is an ordered succession of serial and parallel events. An event is the retrieval of specified data from one or more sources, the managed addition, change or deletion of data, the approval of the new data, and the return of specified data to one or more destinations.

There are two classes of events, dependent and prerequisite. A dependent event is launched by a user, another event, or an application call. The prerequisite event is launched by a dependent event. The dependent that launched the prerequisite event may be dependent on the successful completion of a prerequisite event. The dependent event may retrieve (or nest) data from one or more of its prerequisite events within itself. This "nested" data is analyzed to trigger additional approvers.

Dependent events contain the business rules that generate approval. Prerequisite events may not.

Event Sequence:

An event is a five-step, state driven process: launch, build, analyze, approve and execute. Each stage has a method of entrance and a method of exit. Any method of entrance or method of exit can be manually engaged by a user or automatically engaged by business rules contained in the event.

Figure 3:
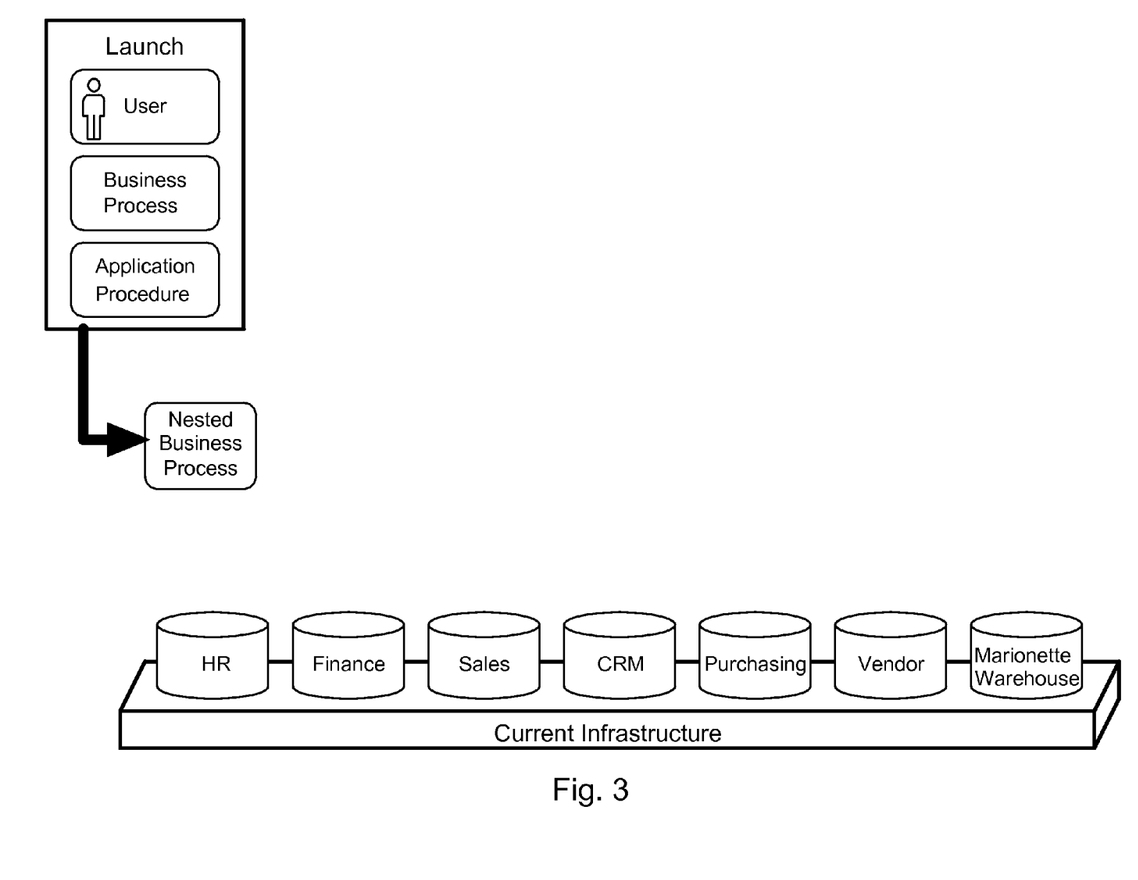
FIG. 3 is a diagram illustrating the launch of events in accordance with one embodiment.

Launch:

Launch is the creation of the event. Launch is illustrated in FIG. 3. Dependent events may be launched by a user, the completion of another prerequisite or dependent event, or from an internal or external application procedure. One or more prerequisite events may be launched by a dependent event.

Figure 5:
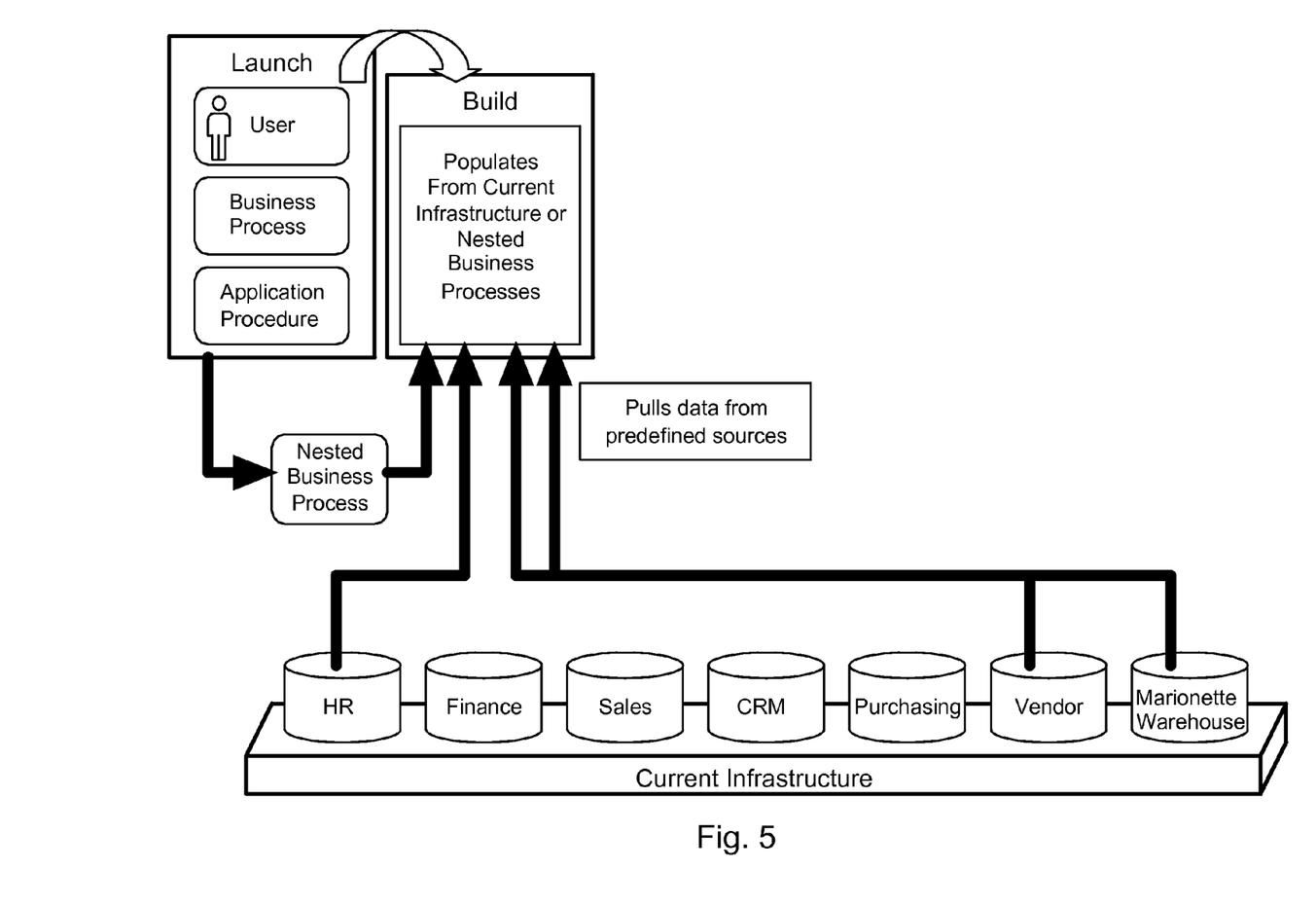
FIG. 5 is a diagram illustrating the build state of an event in accordance with one embodiment.

Build:

Build is the state or an event where information is retrieved from predefined sources and user input may be allowed. Build is illustrated in FIG. 5. Sources may be events such as prerequisite events launched by the event; other events; internal applications; vendor, partner or customer applications; hosted, web and Internet applications; documents; and other sources. The address of the source, unique identifier, and definition of the data being retrieved are contained in the event.

Figure 4:
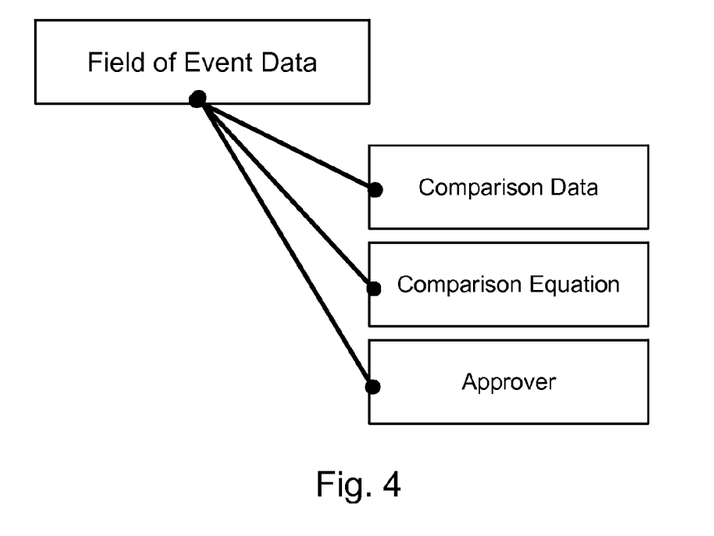
FIG. 4 is a diagram illustrating the association of rules with fields of event data in accordance with one embodiment.

Referring to FIG. 4, dependent events may have rules associated with any field of data managed by the event. Rules are contained in the dependent event. Rules are unique to each field. Rules consist of comparison data or sets of comparison data to be used for analysis against field data, a comparison operator to drive the analysis, and an approver(s) to be used if the analysis is true.

Comparison operators may be numbers, text, dates, currency, etc. Comparison equations may be $>, <, >=, <=, =, <>, ><$, Boolean expressions, mathematical calculations, date calculations, etc. Approvers may be user names, ID numbers, roles, positions, or other unique user identification.

The build state may allow the user to add, change or delete predefined data. Rules governing which information may be added, changed or deleted are properties of the event.

Summarize changes its state to Analyze. The user may manually summarize the event or the event may automatically summarize the event.

Figure 6:
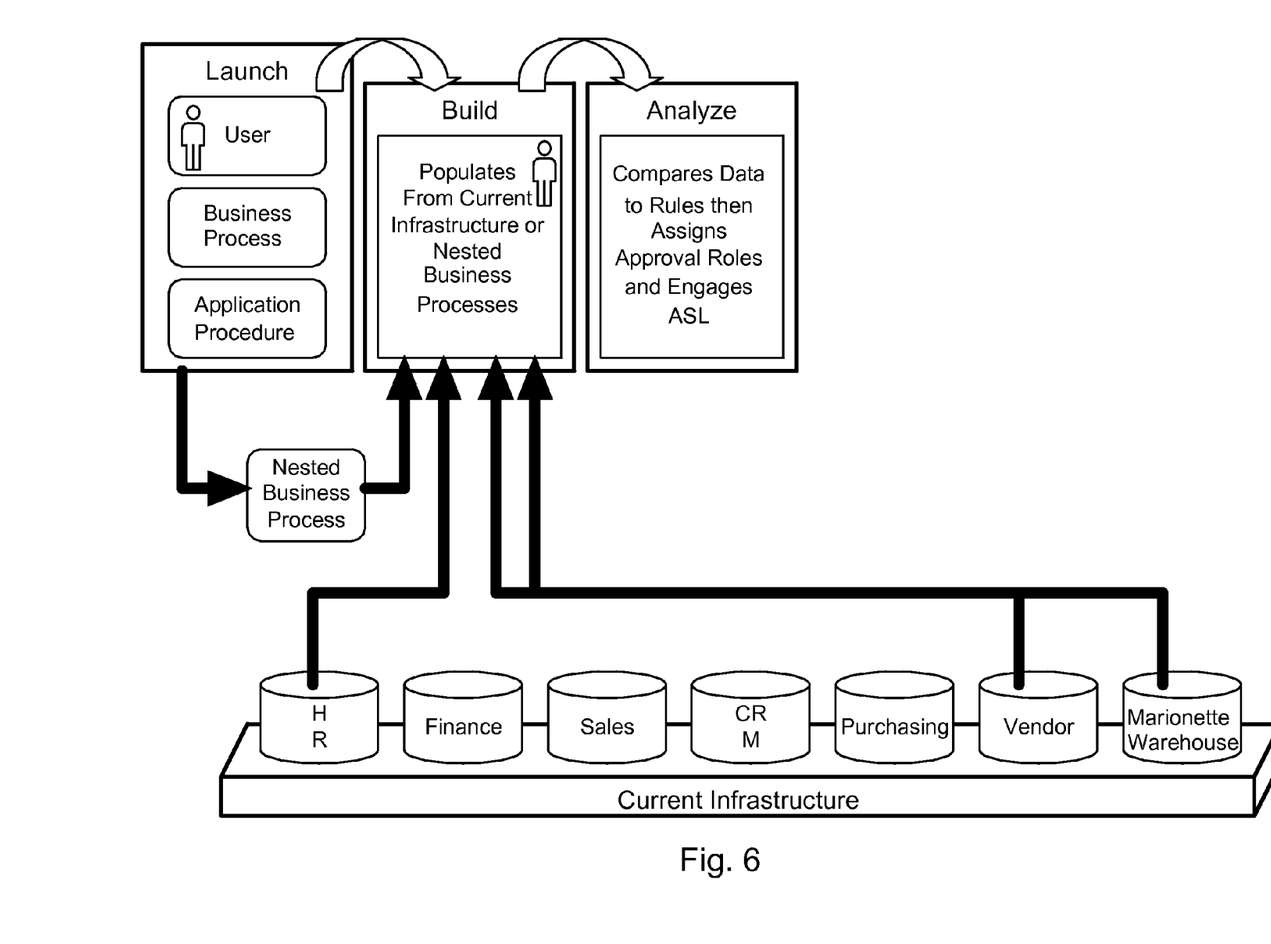
FIG. 6 is a diagram illustrating the analyze state of an event in accordance with one embodiment.

Analyze:

The analyze state allows the event to analyze each field against the field's rules and list Approvers for all true comparisons. Analyze is illustrated in FIG. 6.

Submit changes the state to Approval. Events may be submitted in various ways. The event may automatically submit when all comparisons are false. The event may automatically submit whether the comparisons are true or false. The event may automatically submit based on a date calculation whether all comparisons are true or false. The user may manually submit whether comparisons are true or false.

Figure 7:
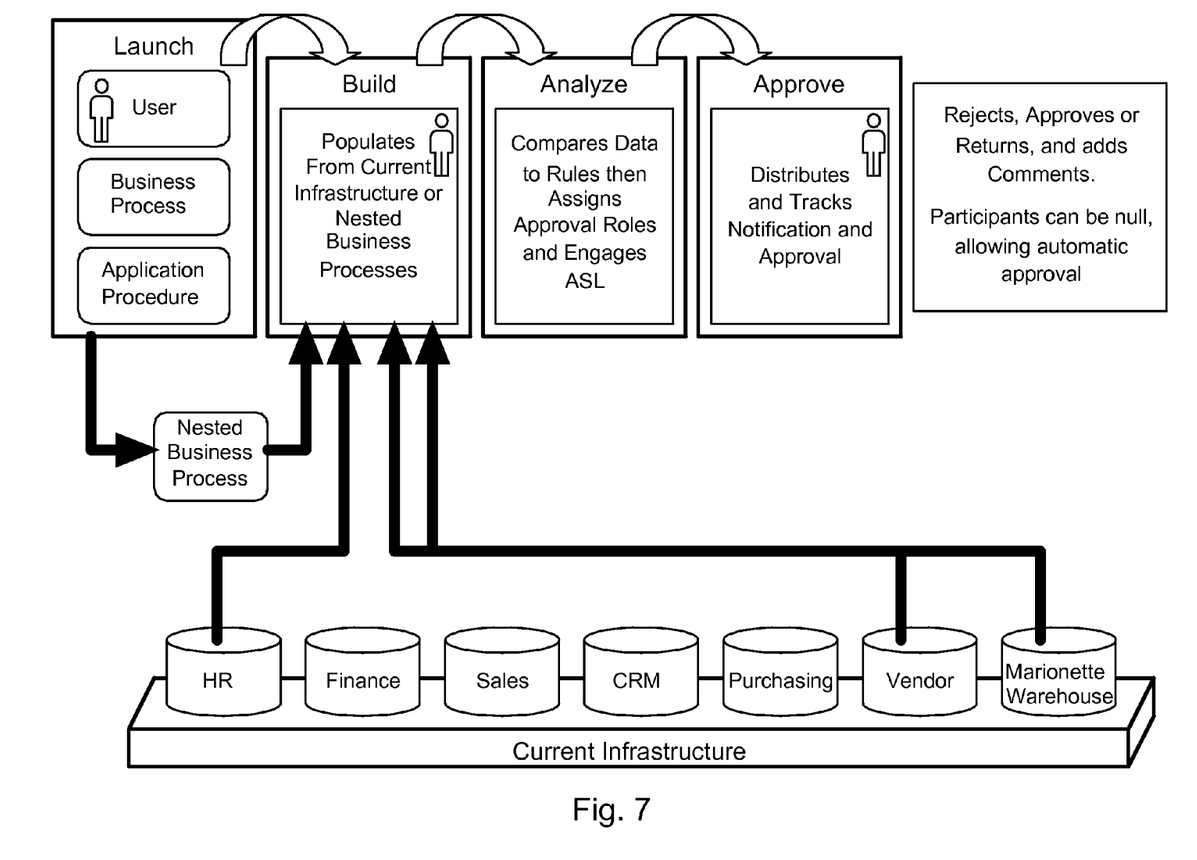
FIG. 7 is a diagram illustrating the approve state of an event in accordance with one embodiment.

Approve:

Approve is the state where approvers may be required to approve or decline the event. Approve is illustrated in FIG. 7. The process of notifying approvers may be accomplished via email, pager, cell phone, etc.

The approver may approve or decline the event and enter comments. If any approver declines the state changes to Build. If all approvers approve, the state changes to Execute.

Figure 8:
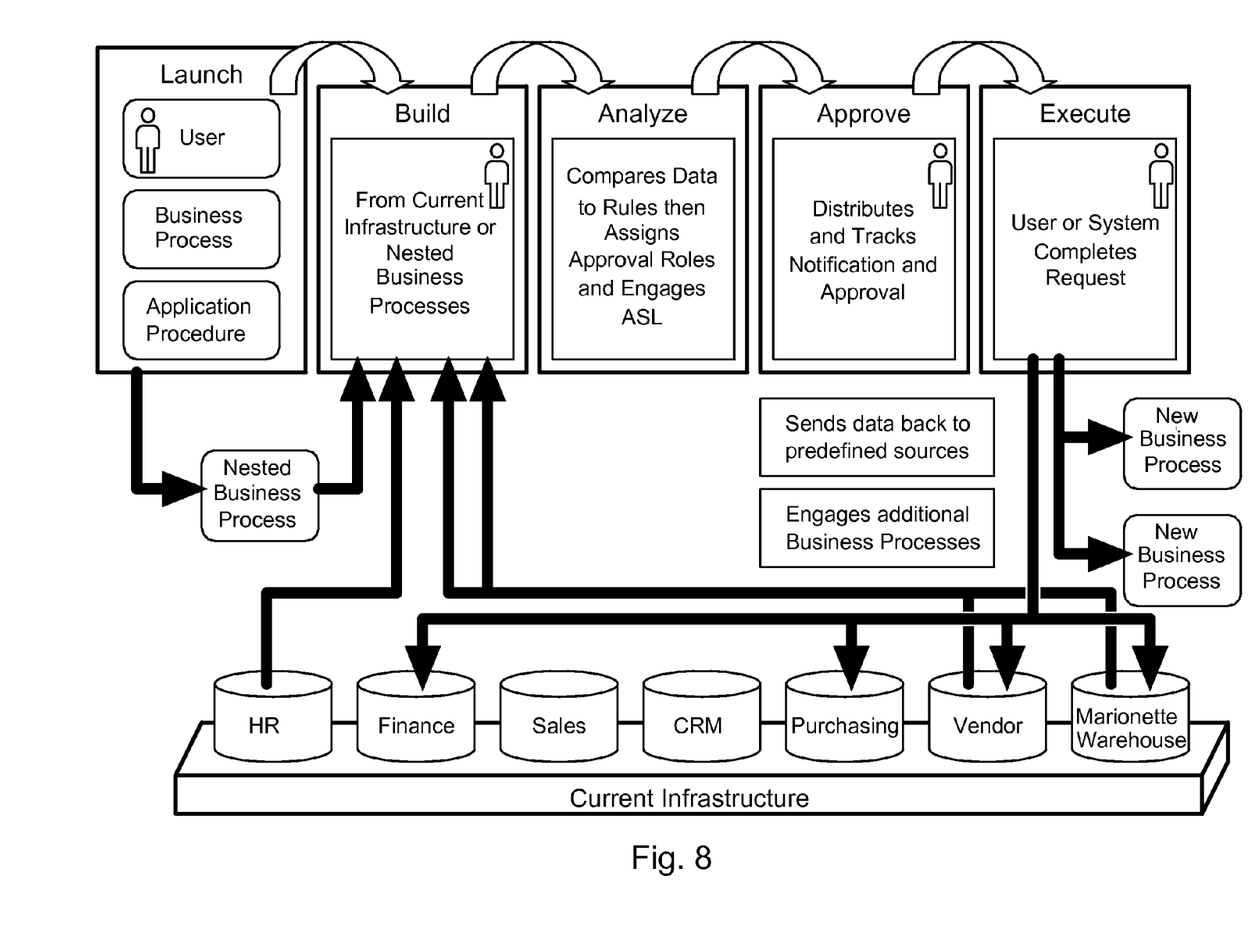
FIG. 8 is a diagram illustrating the execute state of an event in accordance with one embodiment.

Execute:

Execute is the state where the event sends data to its destination(s). The execute state is illustrated in FIG. 8. The event may send information from itself and/or its prerequisite events to predefined destinations. The dependent event may also launch one or more dependent events. The event may be set up to automatically send some or all of its information and new event launches automatically upon approval. It may also be set up to send some or all of its information and new event launches manually. In other words, the event could send some combination of information and new events automatically, and require a user to manually complete the event to send other information and launch other events.

Destinations may be an internal application; hosted, external, or web applications; documents; vendor, customer or partner applications; or some other receptor of information.

Completion of the dependent event may cause the completion of one or more prerequisite events. One or more prerequisite events may be left to complete as they normally would.

Full Business Process:

13 events make up the full business process of hiring a new employee. Three are dependent processes. Administration of the complete business process is accomplished in these three events.

Figure 9:
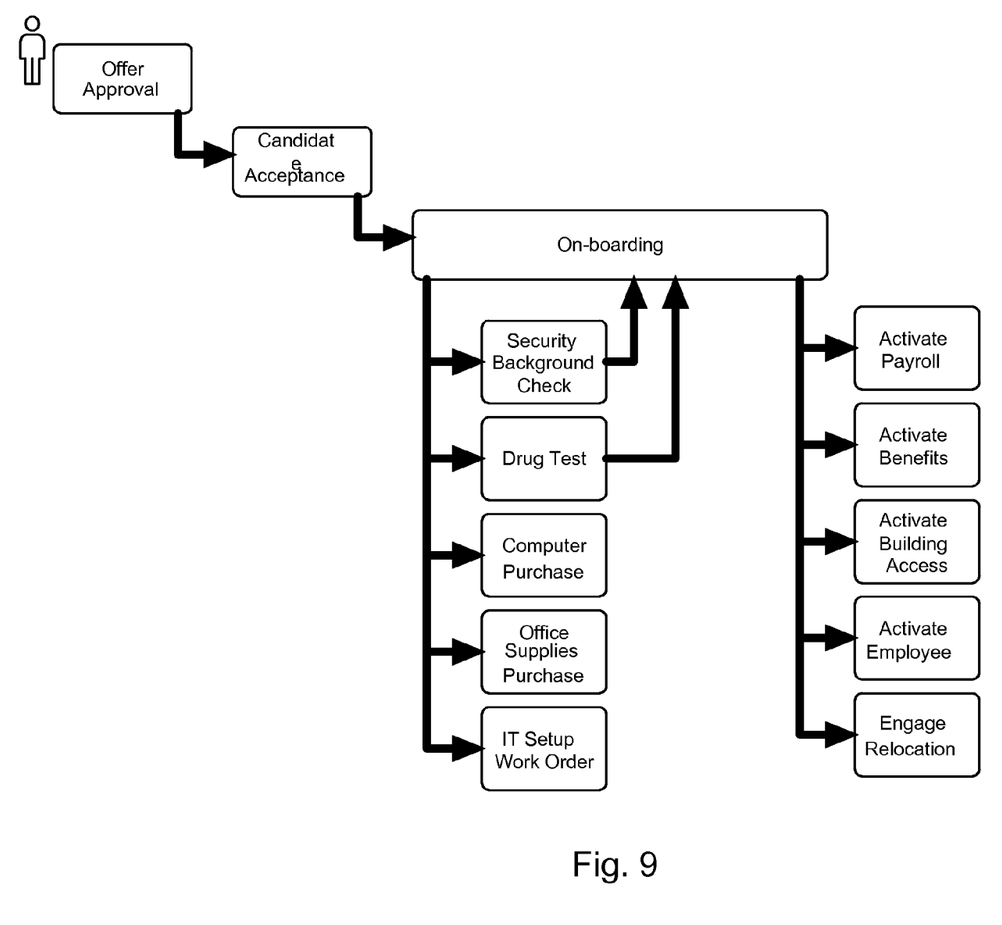
FIG. 9 is a diagram illustrating the business process of hiring a new employee in according one embodiment.

Referring to FIG. 9, the full business process of hiring a new employee starts with the dependent event of approving an offer and ends with the events of creating a new employee record and starting all the related employee services.

Offer Approval:

A user engages the offer approval event. The offer approval event retrieves salary low, mid and high points from the compensation application keyed by the grade; candidate information, and title and job description from the staffing application; and hiring manager and recruiter information from the human resources application. The user enters the offer salary and summarizes the event. The event analyzes the offer salary against the salary low, mid and high points to determine if approval is required, and if so lists the approvers. The user submits the event and the state changes to Approval. The approvers all approve and the state changes to Execute. The user executes the event. The state changes to Completed and a candidate acceptance event is launched.

Candidate Acceptance:

The candidate acceptance event retrieves information from the offer approval event. The user enters the candidates decision and summarizes the event. No approvers are required so the event automatically changes its state to execute. The event automatically completes and launches the on-boarding event.

On-Boarding:

The on-boarding events retrieves information from the offer approval and the candidate acceptance events and launches the security background check, drug test, computer purchase, office supplies purchase and IT set up work order events.

The on-boarding event also retrieves the status of the security background test and the drug test events. The security background check and drug test events are therefore nested prerequisite events. The other prerequisite events are not nested.

Each prerequisite event automatically retrieves information from sources predetermined by their own event. Each automatically submits.

The security background test and the drug test approvers are their respective vendors. When the vendors approve the testes, each automatically completes and changes the state to Complete.

The computer and office supply orders require no approval and automatically change state to Execute. Each sends its information in the form of a PO to the vendor and waits to be manually completed when the order arrives. When the order arrives, the user manually completes and the event sends information to the asset management application and the finance application.

The IT set up event requires the IT set up employee to approve when they get the work done. Upon approval, the event automatically completes.

The on-boarding event retrieves the current status of the security background and drug tests at timed intervals. The on-boarding event has rules for the nested field of status for both nested events. Comparison data is "compete". The comparison operator is "Not" and the approver is Fred the VP. When both events have a status of complete, the event may automatically submit with no approval. The event may automatically submit regardless of the status of the nested prerequisites three days before the scheduled start date, which would require Fred the VP to approve. The user may manually submit before both nested prerequisite events have status of complete, which would require Fred the VP to approve.

Once in the Execute stage, the on-boarding event waits for the user to complete the event to create the employee record, turn on benefits, engage relocation and turn on building access.

Figure 10:
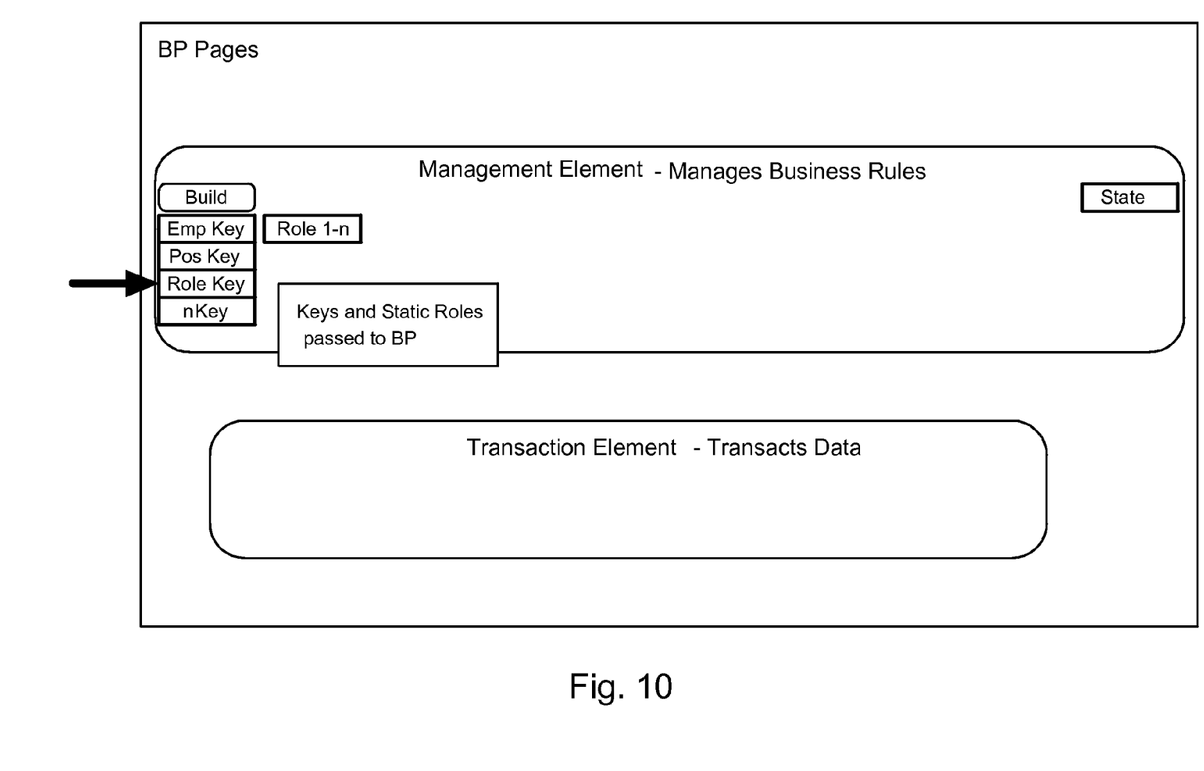
FIG. 10 is a diagram illustrating a dual element event in accordance with one embodiment.

Dual Element Event. A dual element event consisting of a Management Element and a Transactional Element are used. The dual element is illustrated in FIG. 10. In summary, the Management Element controls the Transaction Element.

Management Element. The Management Element is a standard object for every Event, which first accepts key information regarding static approval roles, the position and the user who is requesting the Event, the position and the user who is affected by the event, and any other information that is necessary to transact the Event.

The management element launches one or more transaction elements and shares key information required by the transaction element.

The management element manages the Event State, and passed that state to each transaction element. The transactional element uses that state to drive its exchange of information.

The transaction element communicates with data sources and can query information from those sources or send information back to those sources based upon the state of the management element.

Figure 11:
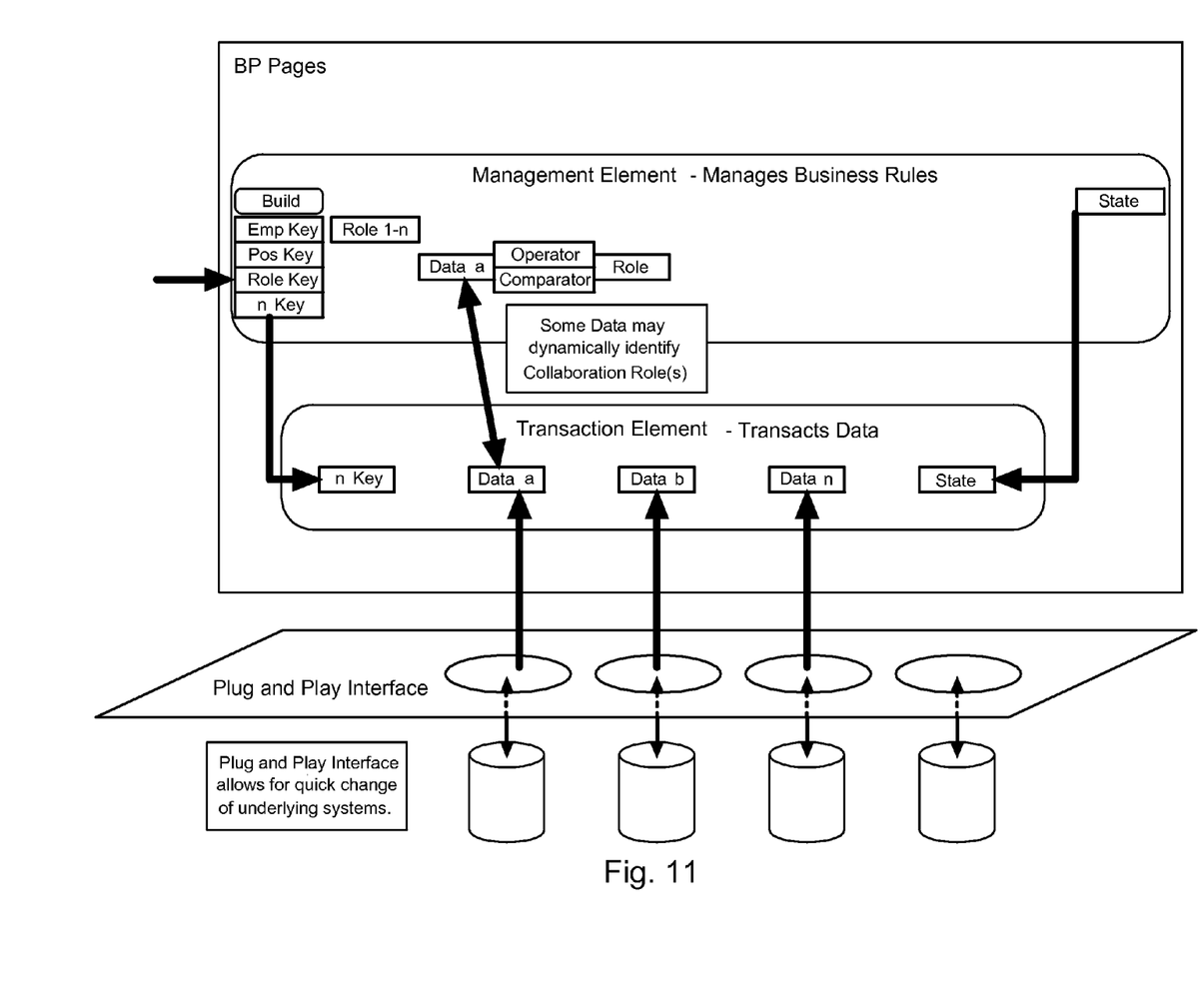
FIG. 11 is a diagram illustrating the mirroring of information in a transaction element by a management element in accordance with one embodiment.

The management element mirrors selected information held in the transaction element and may allow the user to edit, or add new information. This is illustrated in FIG. 11.

Figure 12:
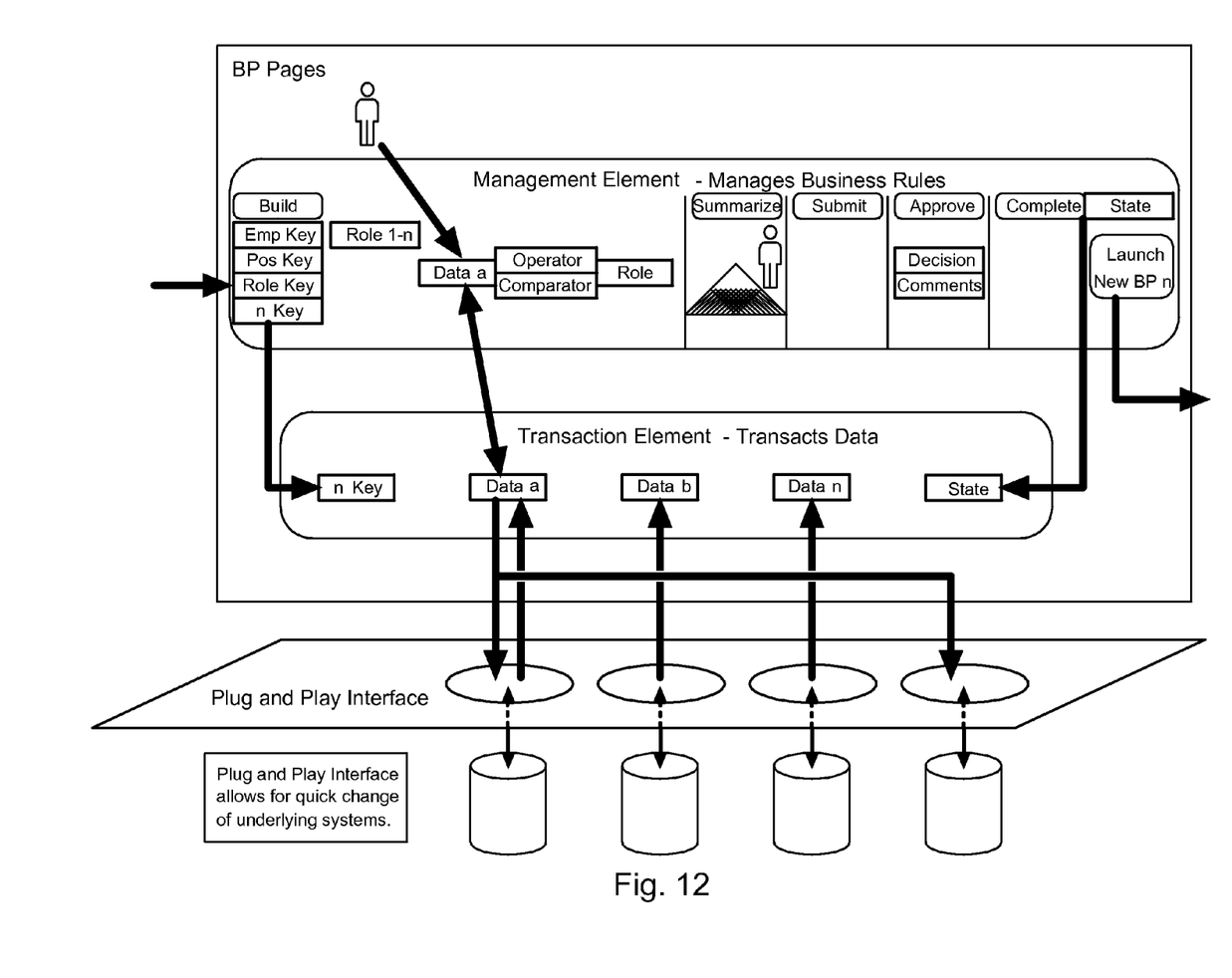
FIG. 12 is a diagram illustrating a management element triggering a dynamic approval role in accordance with one embodiment.

Data that is mirrored by the management element may be compared specific information to trigger a dynamic approval role as shown in FIG. 12.

The management element is summarized by the user triggering Automated Signature Looping and identifying the approving people by their role within the organization. Upon completion of approvals, the management element state change causes each transaction to send its information to its sources.

Multiple transaction elements can be used for each management element. It is possible to use the same transaction element in many management elements, which allows them to be stored in a library and dropped into management elements wherever necessary.

For example, a change of employee status may be required to hire a new employee, to grant a leave of absence to an existing employee, and to terminate an employee. The same transaction element that changes the status of the employee can be used in each Event.

This makes it possible to change something at the data source or the query of the transaction, and that change is automatically felt in every management element using the transaction.

For example, if the HR system is changed from Great Plains to PeopleSoft, a single change is made to the transaction element and all Events using that transaction are automatically changed.

Figure 13:
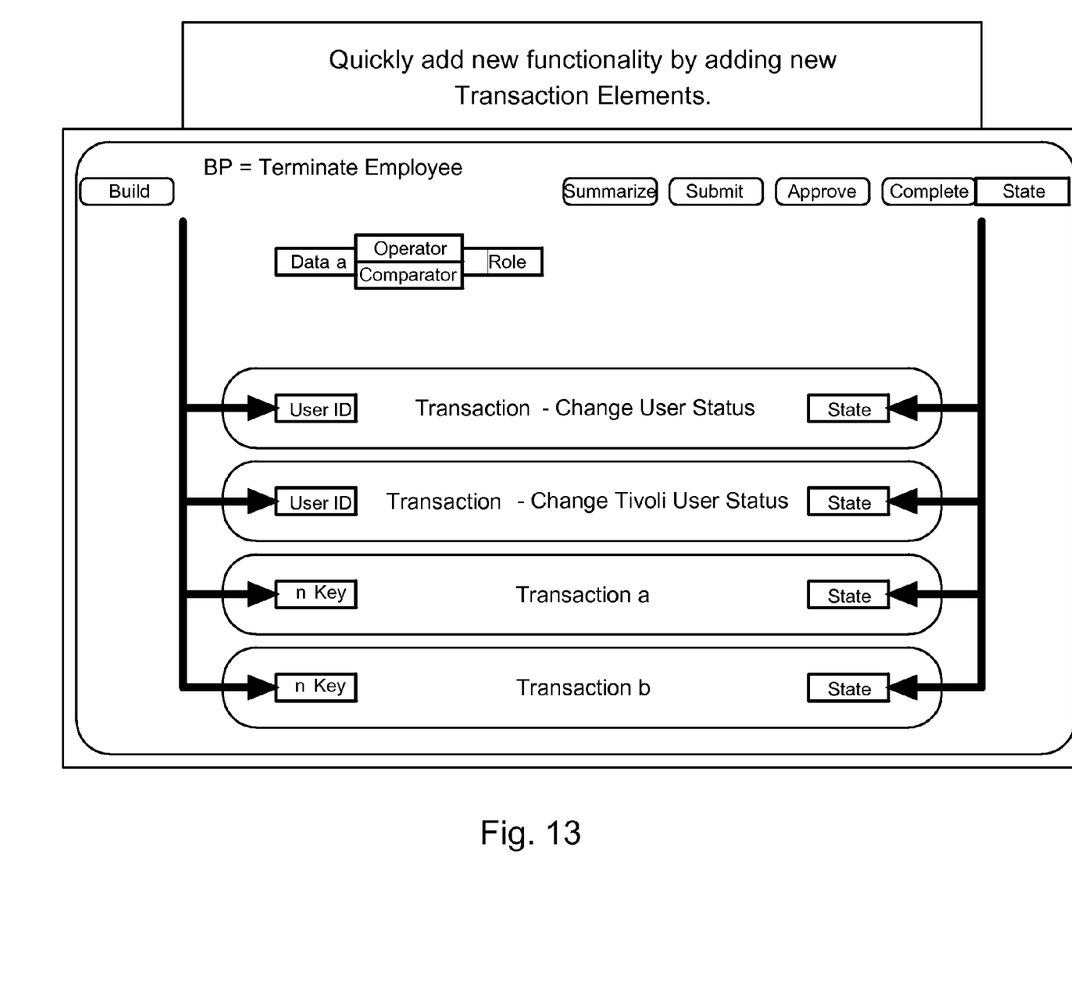
FIG. 13 is a diagram illustrating the addition of new transactions to management elements in accordance with one embodiment.

In addition, new functionality can be quickly added to existing business processes simply by adding transactions and dropping them into existing management elements. This is illustrated in FIG. 13.

Figure 14:
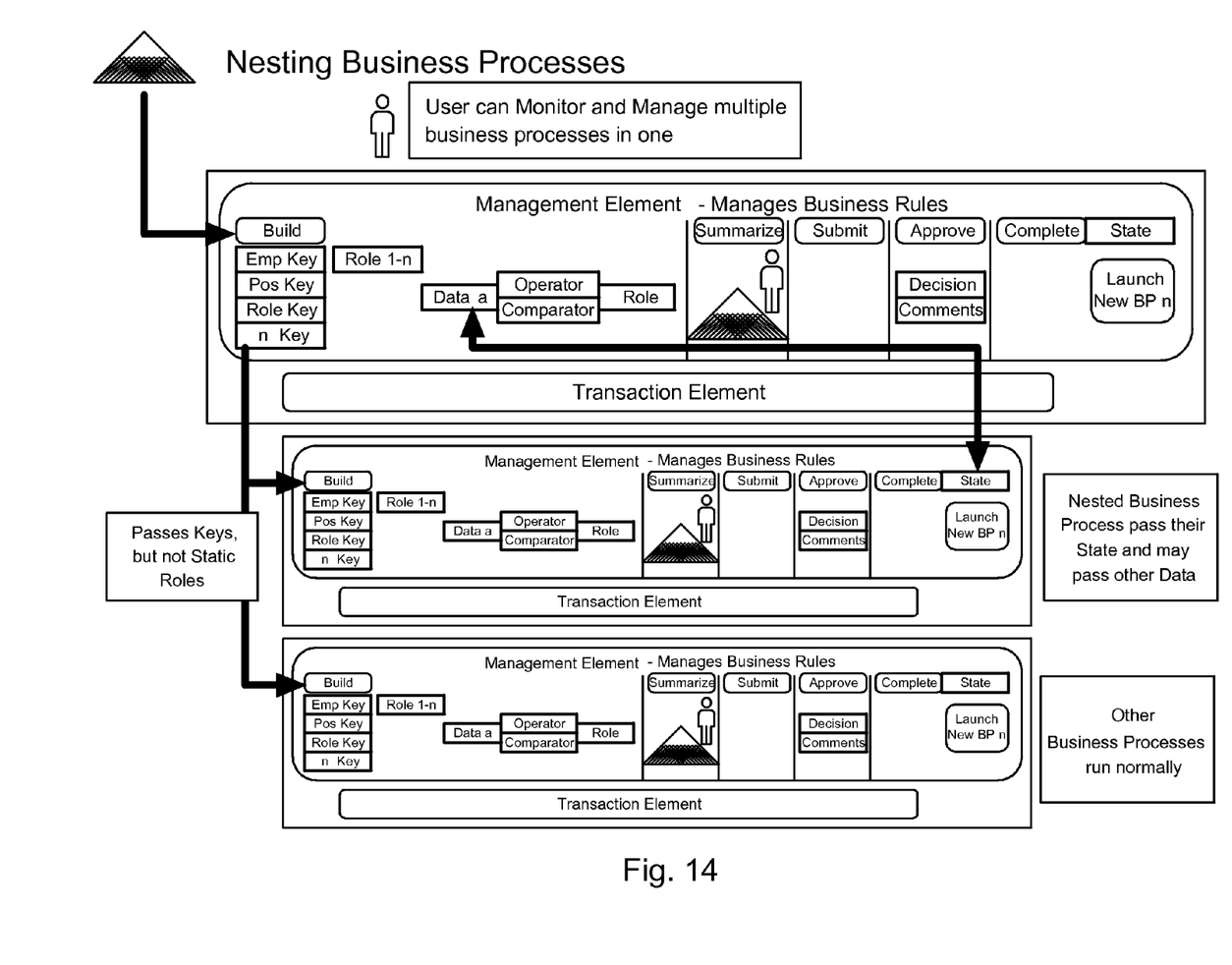
FIG. 14 is a diagram illustrating an example of nested business processes in accordance with one embodiment.

Nesting business processes works the same as described above. An example of nested business processes is illustrated in FIG. 14.

What is claimed is:

1. A method for execution of a business process, wherein the business process is an event-driven activity including first and secondary events, wherein the method comprises the computer-implemented automatic steps:

a computer initiating the first event in response to user input;

the first event initiating one or more of the secondary events;

a first one of the secondary events providing information corresponding to the first secondary event to the first event;

the first event processing the information received from the first secondary event;

the computer associating a set of exception handling rules with the first event;

the computer determining whether the information provided by one of the secondary events activates an exception event;

when an exception event does not occur, the computer completing the first event based upon the information received from the first secondary event; and when an exception event occurs, the computer analyzing the information provided by the one of the secondary events based on the exception handling rules, thereby determining one or more approvers and inhibiting completion of the first event until approvals from the one or more approvers are obtained.

2. The method of claim 1:

wherein the first event comprises a management element and the one or more secondary events comprise transaction elements;

wherein the method further comprises the management element managing multiple transaction elements, storing information required by transaction elements to retrieve and distribute data, storing information identifying the approvers, and storing transaction element information, and the transaction element storing data from one or more applications, databases or data repositories, storing state information received from the management element, sharing data with the management element, distributing data to other applications, databases or data repositories, and retrieving or sending data based on state information received from the management element.

3. The method of claim 1, further comprising the first event automatically monitoring information associated with the first one of the secondary events.

4. The method of claim 3, wherein the information associated with the first secondary event comprises status of the first secondary event.

5. The method of claim 3, further comprising automatically providing the information from first secondary event to the first event upon completion of the first secondary event.

6. The method of claim 1, wherein providing information corresponding to the first secondary event to the first event is performed prior to completion of the first secondary event.

7. The method of claim 6, further comprising the first event beginning processing of the information corresponding to the first secondary event prior to completion of the first secondary event.

8. The method of claim 1, wherein the first event processing the information corresponding to the first secondary event comprises the first event analyzing the information corresponding to the first secondary event against a set of rules contained in the first event.

9. The method of claim 8, further comprising initiating a second event, and the second event automatically initiating at least one of the secondary events.

10. The method of claim 1, wherein determining one or more approvers comprises identifying one or more positions within an organization who are required to approve completion of the first event.

11. The method of claim 10, further comprising transmitting messages to the one or more identified positions requesting approval for completion of the first event.

12. A software program product including a non-transitory computer-readable medium having one or more instructions stored thereon, wherein the instructions are executable by a computer to cause the computer to perform a method for executing a business process which is an event-driven activity including first and secondary events, wherein the method comprises the automatic steps:

initiating the first event in response to user input;

the first event automatically initiating one or more of the secondary events;

a first one of the secondary events providing information corresponding to the first secondary event to the first event;

the first event processing the information received from the first secondary event;

associating a set of exception handling rules with the first event;

determining whether the information provided by one of the secondary events activates an exception event;

when an exception event does not occur, completing the first event based upon the information received from the first secondary event; and when an exception event occurs, analyzing the information provided by the one of the secondary events based on the exception handling rules, thereby determining one or more approvers, and inhibiting completion of the first event until approvals from the one or more approvers are obtained.

13. The software program product of claim 12, wherein the method further comprises the first event automatically monitoring information associated with the first secondary event.

14. The software program product of claim 13, wherein the information associated with the first secondary event comprises status of the first secondary event.

15. The software program product of claim 13, wherein the method further comprises automatically providing the information from first secondary event to the first event upon completion of the first secondary event.

16. The software program product of claim 12, wherein providing information corresponding to the first secondary event to the first event is performed prior to completion of the first secondary event.

17. The software program product of claim 16, wherein the method further comprises the first event beginning processing of the information received from the first secondary event prior to completion of the first secondary event.

18. The software program product of claim 12, wherein processing the information received from the first secondary event by the first event comprises analyzing the information received from the first secondary event against a set of rules contained in the first event.

19. The software program product of claim 18, wherein the method further comprises the one or more secondary events proceeding independent of the first event.

20. The software program product of claim 18, wherein the method further comprises one or more additional events reusing the one or more secondary events.

21. The software program product of claim 12:

wherein the first event comprises a management element and the one or more secondary events comprise transaction elements;

wherein the management element includes a state engine configured to manage the transaction elements, a repository for information required by transaction elements to retrieve and distribute data, a repository for information identifying the approvers, and a repository for transaction element information, and is configured to manage multiple transaction elements; and wherein the transaction element includes a repository for data from one or more applications, databases or data repositories and a repository for state information received from the management element, and is configured to share data with the management element, distribute data to other applications, databases or data repositories, and retrieve or send data based on state information received from the management element.

22. The software program product of claim 12, wherein determining one or more approvals necessary to complete the first event comprises identifying one or more positions within an organization who are required to approve completion of the first event.

23. The software program product of claim 22, wherein the method further comprises transmitting messages to the one or more identified positions requesting approval for completion of the first event.

24. A method for execution of a business process, wherein the business process is an event-driven activity including first and secondary events, wherein the method comprises the computer-implemented automatic steps:

the computer receiving in user input from a user;

an internal application procedure executing on the computer initiating the first event in response to the user input;

the first event initiating one or more of the secondary events;

a first one of the secondary events providing information corresponding to the first secondary event to the first event;

the first event processing the information received from the first secondary event;

the internal application procedure associating a set of exception handling rules with the first event;

the internal application procedure determining whether the information provided by one of the secondary events activates an exception event;

when an exception event does not occur, completing the first event based upon the information received from the first secondary event; and when an exception event occurs, the internal application procedure analyzing the information provided by the one of the secondary events based on the exception handling rules, thereby determining one or more approvers and inhibiting completion of the first event until approvals from the one or more approvers are obtained, wherein determining the one or more approvers comprises identifying one or more positions within an organization who are required to approve completion of the first event, the internal application procedure further transmitting approval request messages to the one or more identified positions via a communication channel selected from the group consisting of email, pager and cell phone.

* * * * *